(12) United States Patent
Nakamura et al.

(10) Patent No.: US 11,411,697 B2
(45) Date of Patent: Aug. 9, 2022

(54) TERMINAL APPARATUS AND BASE STATION APPARATUS

(71) Applicants: SHARP KABUSHIKI KAISHA, Sakai (JP); FG Innovation Company Limited, Tuen Mun (HK)

(72) Inventors: Osamu Nakamura, Sakai (JP); Jungo Goto, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 38 days.

(21) Appl. No.: 16/649,589

(22) PCT Filed: Sep. 25, 2018

(86) PCT No.: PCT/JP2018/035367
§ 371 (c)(1),
(2) Date: Mar. 20, 2020

(87) PCT Pub. No.: WO2019/065595
PCT Pub. Date: Apr. 4, 2019

(65) Prior Publication Data
US 2020/0259612 A1     Aug. 13, 2020

(30) Foreign Application Priority Data
Sep. 26, 2017   (JP) .............................. JP2017-184638

(51) Int. Cl.
*H04L 5/00* (2006.01)
*H04J 11/00* (2006.01)

(52) U.S. Cl.
CPC ......... *H04L 5/0048* (2013.01); *H04J 11/0026* (2013.01)

(58) Field of Classification Search
CPC ... H04L 5/0048; H04L 5/0053; H04L 5/0051; H04L 5/0007; H04L 5/0044;
(Continued)

(56) References Cited

U.S. PATENT DOCUMENTS

2014/0301346 A1* 10/2014 Seo ...................... H04L 5/0048
370/329
2015/0222402 A1   8/2015 Ouchi et al.
(Continued)

FOREIGN PATENT DOCUMENTS

| JP | 2016-519485 A | 6/2016 |
| JP | 2016536928 A | 11/2016 |
| WO | 2014050584 A1 | 4/2014 |

OTHER PUBLICATIONS

3rd Generation Partnership Project; Technical Specification Group Radio AccessNetwork; Evolved Universal Terrestrial Radio Access (E-UTRA); Physical layerprocedures(Release 12) 3GPP TS 36.213 v12.5.0 (Mar. 2015).
(Continued)

*Primary Examiner* — Eva Y Puente
(74) *Attorney, Agent, or Firm* — ScienBiziP, P.C.

(57) ABSTRACT

A receiver configured to receive first information on a configuration of a demodulation reference signal via higher layer signaling and receive downlink control information including second information on transmission of the demodulation reference signal via a physical downlink control channel, and a transmitter configured to transmit the demodulation reference signal and uplink data are included. The transmitter transmits the demodulation reference signal and the uplink data by using a same OFDM symbol based on at least the first information and the second information.

8 Claims, 10 Drawing Sheets

(58) Field of Classification Search
CPC ....... H04L 5/0055; H04L 1/00; H04L 1/1812; H04L 5/0023; H04L 5/005; H04W 72/042; H04W 72/0446; H04W 72/0453; H04W 72/1289; H04W 24/10; H04W 72/14; H04W 72/0413; H04W 24/08; H04W 52/146; H04W 72/02; H04B 7/0617; H04B 7/0626; H04B 17/318; H04B 17/336; H04B 7/0452; H04B 7/0469; H04B 7/0486; H04B 7/0695; H04B 17/345; H04B 7/04
USPC ........................................................ 370/329
See application file for complete search history.

(56) References Cited

U.S. PATENT DOCUMENTS

| | | | |
|---|---|---|---|
| 2015/0304995 | A1 | 10/2015 | Yi et al. |
| 2015/0358132 | A1* | 12/2015 | Wallen ................ H04L 5/0048 370/329 |
| 2016/0100398 | A1* | 4/2016 | Xia .................... H04W 72/0413 370/330 |
| 2016/0112994 | A1 | 4/2016 | Wang et al. |
| 2016/0211960 | A1 | 7/2016 | Wang et al. |
| 2018/0279352 | A1* | 9/2018 | Chuang ................ H04B 7/0486 |
| 2020/0021489 | A1* | 1/2020 | Gao ....................... H04W 76/27 |
| 2020/0153590 | A1* | 5/2020 | Ko ........................ H04L 1/0026 |

OTHER PUBLICATIONS

3rd Generation Partnership Project; Technical Specification Group Radio AccessNetwork; Study on Scenarios and Requirements for Next Generation AccessTechnologies;(Release 14) 3GPP TR 38.913 v0.3.0 (Mar. 2016).

Samsung, "Remaining details on DMRS", R1-1715967 3GPP TSG RAN WG1 Meeting NR#3, Nagoya, Japan, Sep. 18-21, 2017.

ITL, "Remaining details on DMRS configuration for NR", R1-1714464 3GPP TSG RAN WG1 Meeting #90, Prague, Czech Republic, Aug. 21-25, 2017.

Huawei et al., "Functionalities and design of reference signal for demodulation of UL Channels", R1-1611246 3GPP TSG RAN WG1 Meeting #87, Reno, USA, Nov. 14-18, 2016.

Samsung, UL DMRS design,3GPP TSG RAN WG1 Meeting #90 R1-1713515, Aug. 25, 2017, pp. 1-3.

Lenovo et al., Discussion on UL DMRS indication, 3GPP TSG RAN WG1 Meeting #90 R1-1712682, Prague, P. R. Czech, Aug. 21-25, 2017, pp. 1-6.

* cited by examiner

TERMINAL APPARATUS AND BASE STATION APPARATUS

TECHNICAL FIELD

The present invention relates to a terminal apparatus and a base station apparatus.

This application claims priority to JP 2017-184638 filed on Sep. 26, 2017, the contents of which are incorporated herein by reference.

BACKGROUND ART

A Long Term Evolution (LTE) communication system that has been standardized by a Third Generation Partnership Project (3GPP) employs Cyclic Prefix Orthogonal Frequency Division Multiplexing (CP-OFDM) that has high tolerance to frequency selective fading in downlink. Meanwhile, to ensure a wide coverage, Discrete Fourier Transform Spread Orthogonal Frequency Division Multiplexing (DFT-S-OFDM, also referred to as Single Carrier Frequency Division Multiple Access (SC-FDMA)) that has higher power efficiency than OFDM is employed in uplink. In addition, control information of a downlink is used for a reference signal to compensate for an influence from fading, and a 3-bit field in Downlink Control Information (DCI) is used for a value of cyclic shift (number of rotations) for the reference signal. A terminal apparatus applies, to the reference signal, a different number of rotations for each terminal apparatus according to the value of the cyclic shift in the received DCI, and performs transmission (NPL 1).

The 3GPP has been standardizing, as a fifth generation mobile communication system (5G), wireless multiple access (new radio, NR) that meets requirements of three use cases: enhanced Mobile Broadband (eMBB) for performing large capacity communications with high frequency utilization efficiency; massive Machine Type Communication (mMTC) for accommodating a large number of terminals; and Ultra-Reliable and Low Latency Communication (URLLC) for achieving high-reliable, low latency communications (NPL 2). In order to satisfy the requirements described above, the use of the CP-OFDM in the uplink has been determined. A demodulation reference signal (DMRS) has two configurations, and it has been agreed that the terminal apparatus selects one among the two configurations based on a notification from a higher layer and transmits it as an uplink reference signal.

CITATION LIST

Non Patent Literature

NPL 1: "3rd Generation Partnership Project; Technical Specification Group Radio Access Network; Evolved Universal Terrestrial Radio Access (E-UTRA); Physical layer procedures (Release 12)" 3GPP TS 36.213 v12.5.0 (2015-03)

NPL 2: "3rd Generation Partnership Project; Technical Specification Group Radio Access Network; Study on Scenarios and Requirements for Next Generation Access Technologies; (Release 14)" 3GPP TR 38.913 v0.3.0 (2016-03)

SUMMARY OF INVENTION

Technical Problem

In the NR, in addition to the switching between the two configurations described above, further switching whether data is transmitted in OFDM symbols including the reference signals, and further switching whether to use the DFT-S-OFDM or the CP-OFDM need to be performed.

An aspect of the present invention has been made in view of these circumstances, and an object of the present invention is to provide a base station apparatus, a terminal apparatus, and a communication method that perform efficient control regarding configurations of multiple reference signals.

Solution to Problem

To address the above-mentioned drawbacks, a base station apparatus, a terminal apparatus, and a communication method according to an aspect of the present invention are configured as follows.

(1) An aspect of the present invention is a terminal apparatus including a receiver configured to receive first information on a configuration of a demodulation reference signal via higher layer signaling and receive downlink control information including second information on transmission of the demodulation reference signal via a physical downlink control channel, and a transmitter configured to transmit the demodulation reference signal and uplink data, wherein the transmitter transmits the demodulation reference signal and the uplink data by using a same OFDM symbol based on at least the first information and the second information.

(2) In addition, in an aspect of the present invention, the downlink control information further includes third information on a number of layers, and the transmitter transmits the demodulation reference signal and the uplink data by using the same OFDM symbol based on at least the first information, the second information, and the third information.

(3) In an aspect of the present invention, the receiver further receives fourth information on a transmission scheme, and in a case that the fourth information indicates a predetermined transmission scheme, the transmitter transmits the demodulation reference signal and the uplink data by using the same OFDM symbol based on at least the first information and the second information.

(4) In addition, in an aspect of the present invention, the receiver further receives fourth information on a transmission scheme, and in a case that the fourth information indicates a predetermined transmission scheme, the transmitter transmits the demodulation reference signal and the uplink data by using the same OFDM symbol based on at least the first information, the second information, and the third information.

(5) An aspect of the present invention is a base station apparatus including a transmitter configured to transmit first information on a configuration of a demodulation reference signal via higher layer signaling and transmit downlink control information including second information on transmission of the demodulation reference signal via a physical downlink control channel, and a receiver configured to receive the demodulation reference signal and uplink data. The demodulation reference signal and the uplink data are multiplexed in the same OFDM symbol based on at least the first information and the second information.

(6) In an aspect of the present invention, the downlink control information further includes third information on the number of layers, and the demodulation reference signal and the uplink data are multiplexed in a same OFDM symbol based on at least the first information, the second information, and the third information.

(7) In addition, in an aspect of the present invention, the transmitter further transmits fourth information on a transmission scheme, and in a case that the fourth information indicates a predetermined transmission scheme, the demodulation reference signal and the uplink data are multiplexed in the same OFDM symbol based on at least the first information and the second information.

(8) In addition, in an aspect of the present invention, the transmitter further transmits fourth information on a transmission scheme, and in a case that the fourth information indicates a predetermined transmission scheme, the demodulation reference signal and the uplink data are multiplexed in the same OFDM symbol based on at least the first information, the second information, and the third information.

(9) In addition, in an aspect of the present invention, first information on a configuration of a demodulation reference signal is received via higher layer signaling and downlink control information including second information on transmission of the demodulation reference signal is received via a physical downlink control channel; the demodulation reference signal and uplink data are transmitted; and the demodulation reference signal and the uplink data are transmitted by using a same OFDM symbol based on at least the first information and the second information.

(10) In addition, in an aspect of the present invention, first information on a configuration of a demodulation reference signal is transmitted via higher layer signaling and downlink control information including second information on transmission of the demodulation reference signal is transmitted via a physical downlink control channel; and the demodulation reference signal and uplink data are received, wherein the demodulation reference signal and the uplink data are multiplexed in a same OFDM symbol based on at least the first information and the second information.

Advantageous Effects of Invention

According to one or more aspects of the present invention, the base station apparatus and the terminal apparatus can perform efficient control with the downlink control information.

DESCRIPTION OF EMBODIMENTS

Figure 1:
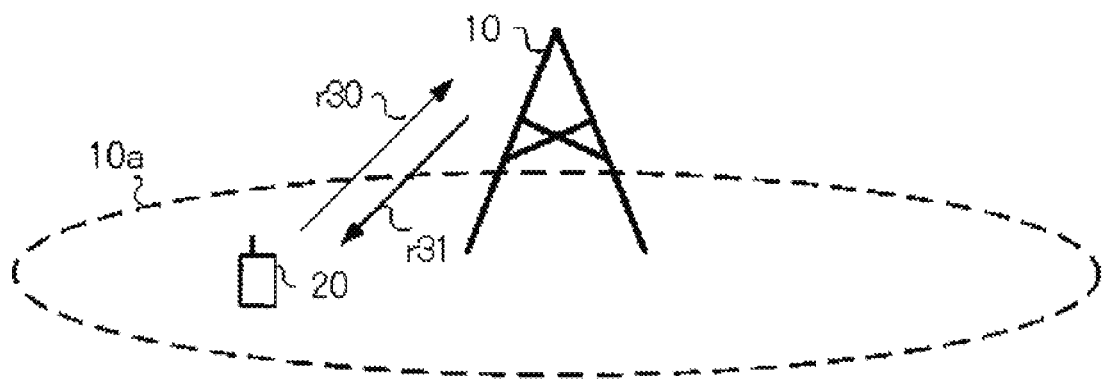
FIG. 1 is a diagram illustrating a configuration example of a communication system 1 according to a first embodiment.

A communication system according to the present embodiments includes a base station apparatus (a cell, a small cell, a serving cell, a component carrier, an eNodeB, a Home eNodeB, and a gNodeB) and a terminal apparatus (a terminal, a mobile terminal, and User Equipment (UE)). In the communication system, in a case of a downlink, the base station apparatus serves as a transmitting apparatus (a transmission point, a transmit antenna group, a transmit antenna port group, or a Tx/Rx Point (TRP)), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D) communication. In this case, the terminal apparatus serves both as a transmitting apparatus and as a receiving apparatus.

The communication system is not limited to data communication between the terminal apparatus and the base station apparatus, the communication involving human beings, but is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a multi-carrier transmission scheme, such as a Cyclic Prefix-Orthogonal Frequency Division Multiplexing (CP-OFDM). The communication system may use, in the uplink, a transmission scheme, such as a Discrete Fourier Transform Spread-Orthogonal Frequency Division Multiplexing (DFTS-OFDM, also referred to as an SC-FDMA). Although the following describes a case of using an OFDM transmission scheme in the uplink and the downlink, the transmission scheme is not limited to this and another transmission scheme is applicable.

The base station apparatus and the terminal apparatus according to the present embodiments can communicate in a frequency band for which an approval of use (license) has been obtained from the government of a country or region where a radio operator provides services, that is, a so-called licensed band, and/or in a frequency band for which no approval (license) from the government of the country or region is required, that is, a so-called unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

In the present embodiments, a demodulation reference signal (DMRS) will be mainly described, but the present embodiments may be applied to other reference signals (a sounding reference signal (SRS), a phase tracking reference signal (PTRS), a channel state information reference signal (CSI-RS), and the like). In the present specification, the data may be control information. Although the description is given in a case of an uplink, the present embodiments may be applied to a downlink or a sidelink (inter-terminal communication).

First Embodiment

FIG. 1 is a diagram illustrating a configuration example of a communication system 1 according to the present embodiment. The communication system 1 according to the present embodiment includes a base station apparatus 10 and a terminal apparatus 20. Coverage 10a is a range (a communication area) in which the base station apparatus 10 can connect to the terminal apparatus 20 (coverage 10a is also referred to as a cell). Note that the base station apparatus 10 can accommodate multiple terminal apparatuses 20 in the coverage 10a. The communication system 1 is a system that allows the terminal apparatus 20 to perform switching between multiple transmission schemes and switching of whether to multiplex data and reference signals, and to communicate with the base station apparatus 10.

In FIG. 1, an uplink radio communication r30 at least includes the following uplink physical channels. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is a physical channel that is used to transmit Uplink Control Information (UCI). The uplink control information includes a positive acknowledgement (ACK)/Negative acknowledgement (NACK) in response to downlink data (a Downlink transport block, a Medium Access Control Protocol Data Unit (MAC PDU), a Downlink-Shared Channel (DL-SCH), and a Physical Downlink Shared Channel (PDSCH). The ACK/NACK is also referred to as a Hybrid Automatic Repeat request ACKnowledgement (HARQ-ACK), a HARQ feedback, a HARQ response, or a signal indicating HARQ control information or a delivery confirmation.

The uplink control information includes a Scheduling Request (SR) used to request a PUSCH (Uplink-Shared Channel (UL-SCH)) resource for initial transmission. The scheduling request indicates that the UL-SCH resource for initial transmission is requested.

The uplink control information includes downlink Channel State Information (CSI). The downlink channel state information includes a Rank Indicator (RI) indicating a preferable spatial multiplexing order (the number of layers), a Precoding Matrix Indicator (PMI) indicating a preferable precoder, a Channel Quality Indicator (CQI) designating a preferable transmission rate, and the like. The PMI indicates a codebook determined by the terminal apparatus. The codebook is related to precoding of the physical downlink shared channel. The CQI can use an index (CQI index) indicative of a preferable modulation scheme (for example, QPSK, 16QAM, 64QAM, 256QAMAM, or the like), a preferable coding rate, and a preferable frequency utilization efficiency in a predetermined band. The terminal apparatus selects, from the CQI table, a CQI index considered to allow a transport block on the PDSCH to be received within a predetermined block error probability (for example, an error rate of 0.1).

The PUSCH is a physical channel used to transmit uplink data (an Uplink Transport Block, an Uplink-Shared Channel (UL-SCH)), and CP-OFDM or DFT-S-OFDM is applied as a transmission scheme. The PUSCH may be used to transmit the HARQ-ACK in response to the downlink data and/or the channel state information along with the uplink data. The PUSCH may be used to transmit only the channel state information. The PUSCH may be used to transmit only the HARQ-ACK and the channel state information.

The PUSCH is used to transmit radio resource control (Radio Resource Control (RRC)) signaling. The RRC signaling is also referred to as an RRC message/RRC layer information/an RRC layer signal/an RRC layer parameter/an RRC information element. The RRC signaling is information/signal processed in a radio resource control layer. The RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user equipment-specific (user equipment-unique) information is transmitted using the signaling dedicated to the certain terminal apparatus. The RRC message can include a UE Capability of the terminal apparatus. The UE Capability is information indicating a function supported by the terminal apparatus.

The PUSCH is used to transmit a Medium Access Control Element (MAC CE). The MAC CE is information/signal processed (transmitted) in a Medium Access Control layer. For example, a power headroom may be included in the MAC CE and may be reported via the physical uplink shared channel. In other words, a MAC CE field is used to indicate a level of the power headroom. The uplink data can include the RRC message and the MAC CE. The RRC signaling and/or the MAC CE is also referred to as a higher layer signal (higher layer signaling). The RRC signaling and/or the MAC CE are included in a transport block.

The PRACH is used to transmit a preamble used for random access. The PRACH is used to transmit a random access preamble. The PRACH is used for indicating the initial connection establishment procedure, the handover procedure, the connection re-establishment procedure, synchronization (timing adjustment) for uplink transmission, and the request for the PUSCH (UL-SCH) resource.

In the uplink radio communication, an Uplink Reference Signal (UL RS) is used as an uplink physical signal. The uplink physical signal is not used for transmission of information output from higher layers, but is used by the physical layer. The uplink reference signal includes a Demodulation Reference Signal (DMRS) and a Sounding Reference Signal (SRS). The DMRS is associated with transmission of the physical uplink-shared channel/physical uplink control channel. For example, the base station apparatus 10 uses the demodulation reference signal to perform channel estimation/channel compensation in a case of demodulating the physical uplink-shared channel/the physical uplink control channel.

In the 3GPP, it has been agreed that two configurations are prepared for the DMRS in NR. One of the two configurations is a configuration illustrated in FIG. 2 (DMRS configuration 1, first demodulation reference signal configuration, first reference signal configuration). A controller in the base station apparatus selects either a pattern in which, among frequency indexes 0, 1, 2, . . . , 11, reference signals are mapped to even subcarriers (frequency indexes 0, 2, 4, . . . , 10) and odd subcarriers (frequency index 1, 3, 5, . . . , 11) are configured as null carriers (the upper drawing in FIG. 2) or a pattern in which, among frequency indexes 0, 1, 2, . . . , 11, the reference signals are mapped to the odd subcarriers (frequency index 1, 3, 5, . . . , 11) and the even subcarriers (frequency indexes 0, 2, 4, . . . , 10) are configured as the null carriers (the lower drawing in FIG. 2). The information is notified to the terminal apparatus via a higher layer processing unit, and a controller in the terminal apparatus maps the reference signals based on the information.

Figure 3:
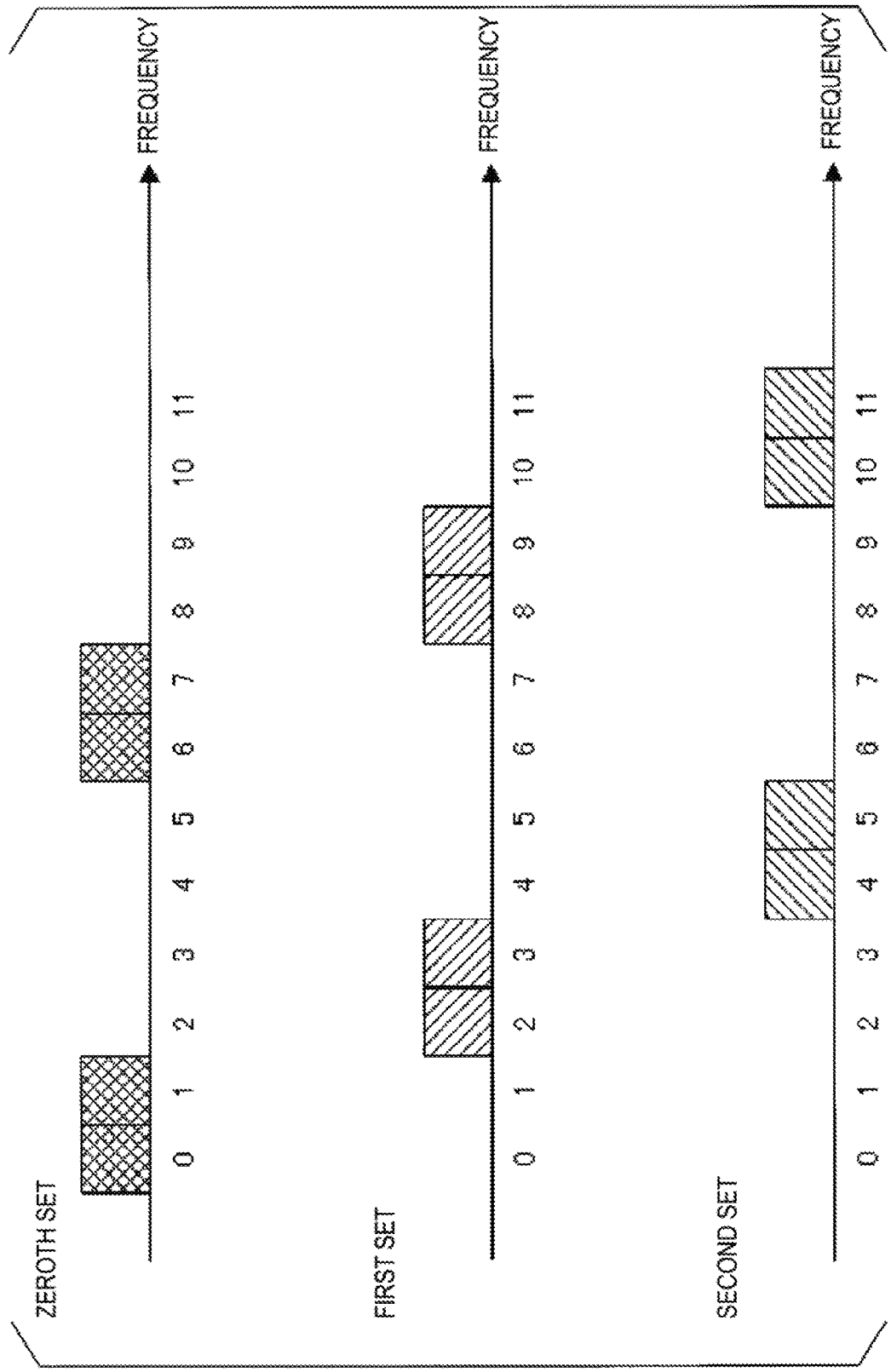
FIG. 3 is a diagram illustrating a frequency allocation of a DMRS configuration 2 according to the first embodiment.

Another one of the two configurations of the DMRS is a configuration illustrated in FIG. 3 (DMRS configuration 2, second demodulation reference signal configuration, second reference signal configuration). The controller in the base station apparatus selects any of a zeroth subcarrier set (drawing on the top in FIG. 3) in which the reference signals are mapped to the frequency indexes 0, 1, 6, and 7, a first subcarrier set (drawing in the middle in FIG. 3) in which the reference signals are mapped to the frequency indexes 2, 3, 8, and 9, and a second subcarrier set (drawing on the bottom in FIG. 3) in which the reference signals are mapped to the frequency indexes 4, 5, 10, and 11) as illustrated in FIG. 3. The information is notified to the terminal apparatus via the higher layer processing unit, and the controller in the terminal apparatus maps the reference signals based on the information. Note that, like the DMRS configuration 1, the null carriers are allocated to subcarriers to which the reference signals are not mapped. That is, no signal is mapped.

In the present embodiment, a case in which the higher layer notifies the controller of information on which configuration of the DMRS configuration 1 and the DMRS configuration 2 is to be selected is considered. However, the notification is not limited to this, and the information may be dynamically notified using L1 signaling, such as the downlink control information (DCI).

Here, with the DMRS configuration 1, since the DMRSs are allocated at regular intervals for each subcarrier at regular intervals, PAPR/CM of the DMRS decreases. Therefore, with the DMRS configuration 1, in addition to the CP-OFDM, the use of the DFT-S-OFDM as the transmission scheme during data transmission is considered. Thus, at least one bit in a field of a DCI format regarding the uplink is used for dynamic switching of the transmission scheme (waveform). Note that the number of bits required for the notification to switch the waveform of the DCI format is not limited to 1, and any multiple bits may be used.

Figure 4:
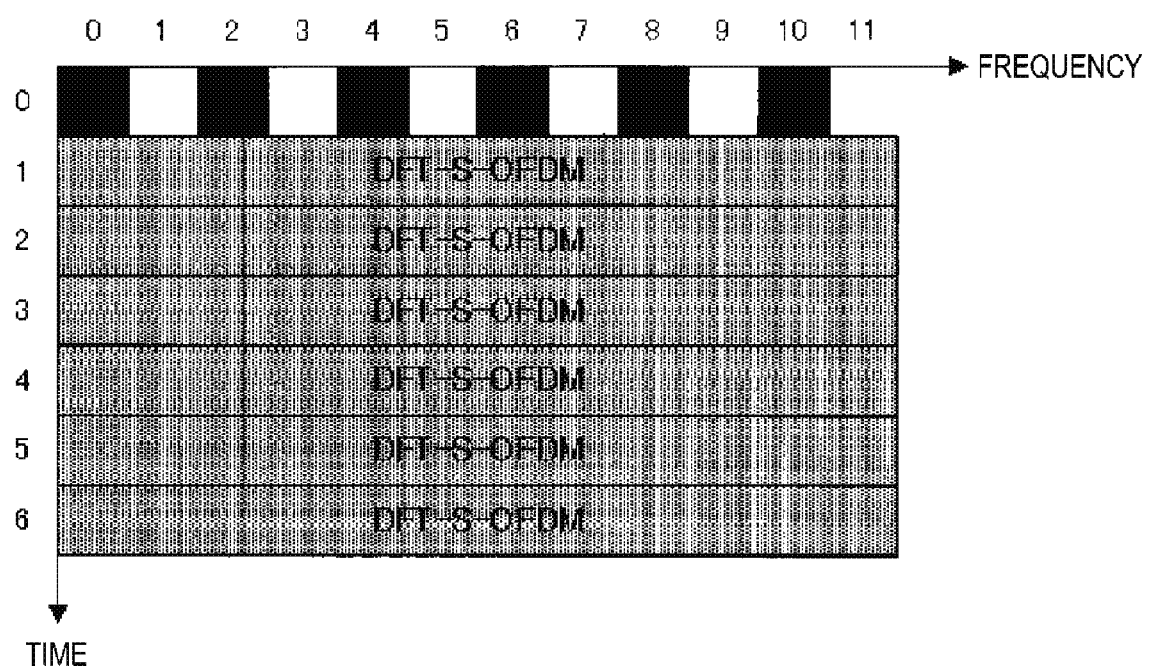
FIG. 4 is a diagram illustrating a slot configuration in a case that DFT-S-OFDM is used as a transmission scheme in the DMRS configuration 1 according to the first embodiment.
Figure 5:
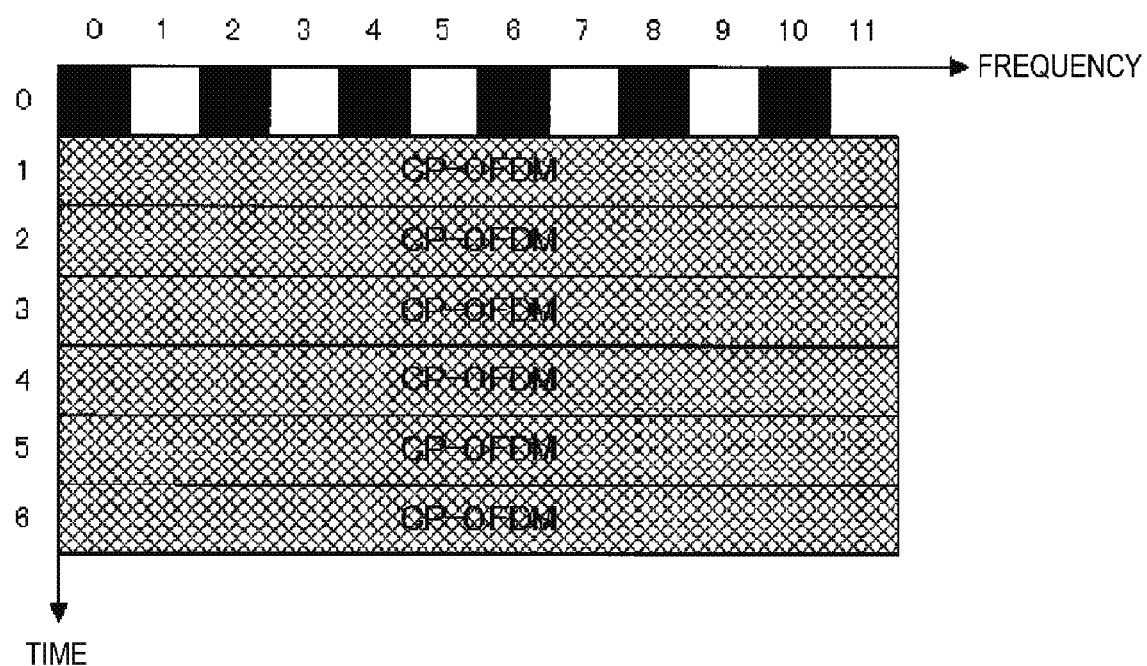
FIG. 5 is a diagram illustrating a slot configuration in a case that CP-OFDM is used as the transmission scheme in the DMRS configuration 1 according to the first embodiment.

The description is given with reference to FIG. 4. FIG. 4 illustrates a case in which the DCI field for indicating the transmission scheme indicates the use of the DFT-S-OFDM. As illustrated in FIG. 4, data is generated in the OFDM symbols from the first OFDM symbol to the sixth OFDM symbol by the DFT-S-OFDM. On the other hand, FIG. 5 illustrates a case in which the DCI field for indicating the transmission scheme indicates the use of the CP-OFDM. As illustrated in FIG. 5, data is generated in the OFDM symbols from the first OFDM symbol to the sixth OFDM symbol by the CP-OFDM. In this manner, in the case that the use of the DMRS configuration 1 is configured by the RRC or the like, the base station apparatus indicates the switching of the waveform to the terminal by using at least one bit in the DCI field, and the terminal apparatus selects and transmits the waveform for PUSCH by using the DCI received. For example, in a case that the DCI field is '0', the DFT-S-OFDM is used as the transmission scheme for PUSCH, and in a case that the DCI field is '1', the CP-OFDM is used as the transmission scheme for PUSCH, or the like.

Next, the case of the DMRS configuration 2 will be described. Since the DMRSs are mapped to continuous two subcarriers, the PAPR/CM of the DMRS increases. Therefore, with the DMRS configuration 2, it is considered that the DFT-S-OFDM is not to be used and only the CP-OFDM is to be used as the transmission scheme. Thus, the base station apparatus uses at least one bit in the DCI format to indicate whether to further include data in the OFDM symbol including the DMRS, instead of using the at least one bit to indicate the switching of the waveform.

Figure 6:
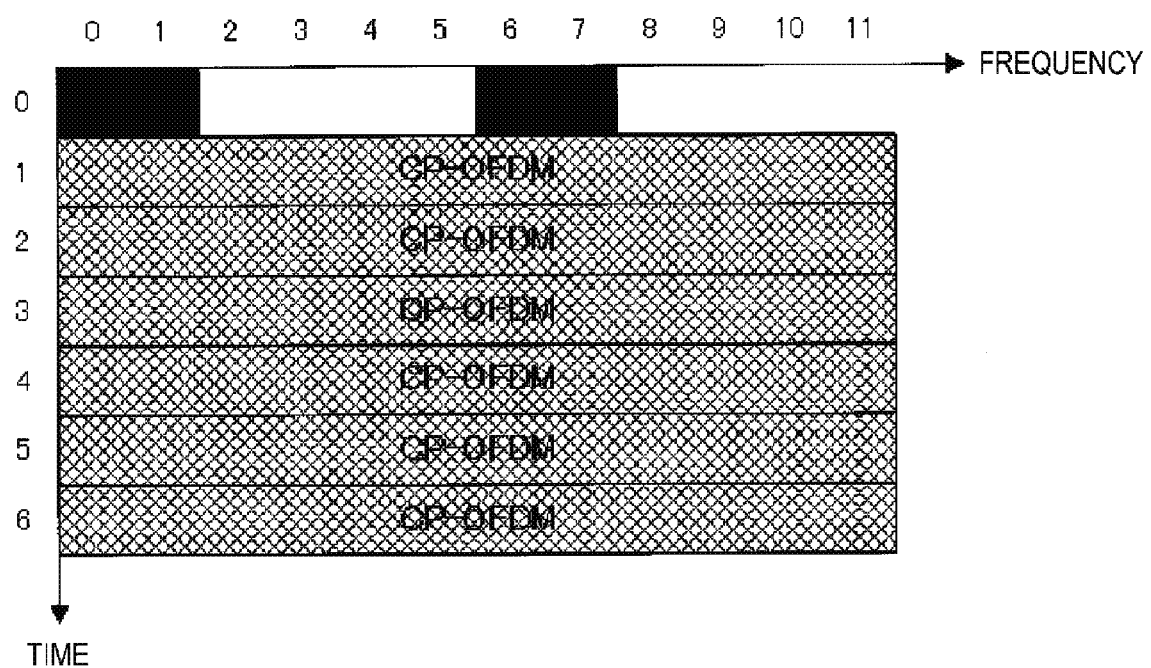
FIG. 6 is a diagram illustrating a slot configuration in a case that a reference signal and data are not multiplexed in the DMRS configuration 2 according to the first embodiment.
Figure 7:
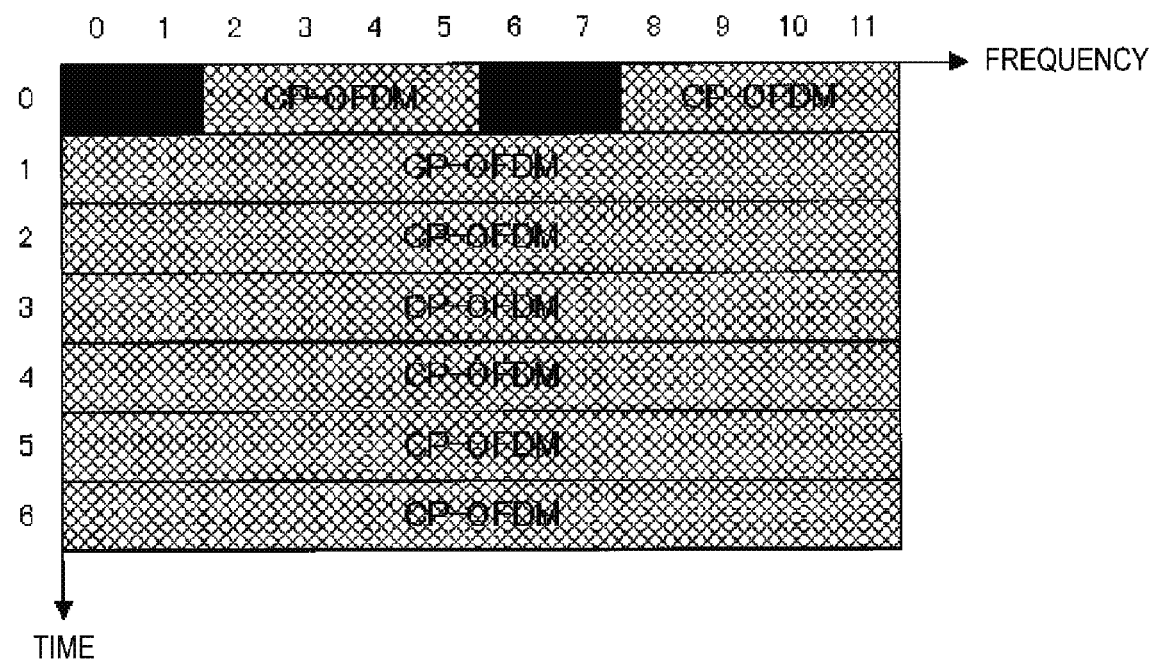
FIG. 7 is a diagram illustrating a slot configuration in a case that the reference signal and data are multiplexed in the DMRS configuration 2 according to the first embodiment.

The description is given with reference to FIG. 6. FIG. 6 illustrates a case in which the DCI field for indicating frequency domain multiplexing (FDM) of the DMRS and data indicates that multiplexing is not to be performed. As illustrated in FIG. 6, data is generated in the OFDM symbols from the first OFDM symbol to the sixth OFDM symbol by the CP-OFDM, and data signal is not mapped to the OFDM symbol to which the DMRS is mapped. On the other hand, FIG. 7 illustrates a case in which the DCI field for indicating the frequency-domain multiplexing of the DMRS and the data indicates that multiplexing is to be performed. As illustrated in FIG. 7, data is generated in the OFDM symbols from the first OFDM symbol to the sixth OFDM symbol by the CP-OFDM, and data signal is mapped to the OFDM symbol to which the DMRS is mapped. Note that in FIG. 7, the data signals are mapped in all resource elements to which the DMRSs are not mapped, but an aspect of the present invention is not limited to this. The data signals may be mapped in some resource elements and null carriers may be mapped in some resource elements. The carrier to be configured as a null carrier may be determined by considering the DMRS to perform SU-MIMO or MU-MIMO. In this manner, in the case that the use of the DMRS configuration 2 is configured by RRC or the like, not a bit for switching the waveform, but a bit for indicating whether to perform the FDM on the data signal and the DMRS is prepared in a field of the DCI. The controller in the terminal apparatus Although the description has been given with the case that the DMRS is mapped only to the first OFDM symbol in a slot in FIG. 4 to FIG. 7 as the example, an aspect of the present invention is not limited to this, and a different mapping of the DMRS may be assumed. For example, more than one OFDM symbol may include the DMRS. For example, in a case of two symbols, the DMRSs are mapped to the zeroth and the first OFDM symbols. Additionally, the DMRS needs not be mapped at the beginning of the slot. For example, a configuration may be employed that maps the DMRS to the first OFDM symbol and that does not map the DMRSs to the zeroth and the second to the sixth OFDM symbols. One slot needs not include seven symbols. That is, an aspect of the present invention can be applied to any natural number.

Thus, according to the present embodiment, in a case that the DMRS configuration 1 is configured, the bit that allows the transmission scheme to be changed is prepared in the DCI field, and in a case that the DMRS configuration 2 is configured, the bit that allows whether to perform the multiplexing of the data signal and the reference signal to be changed is prepared in the DCI field. As a result, efficient control can be performed with a small number of bits.

Figure 2:
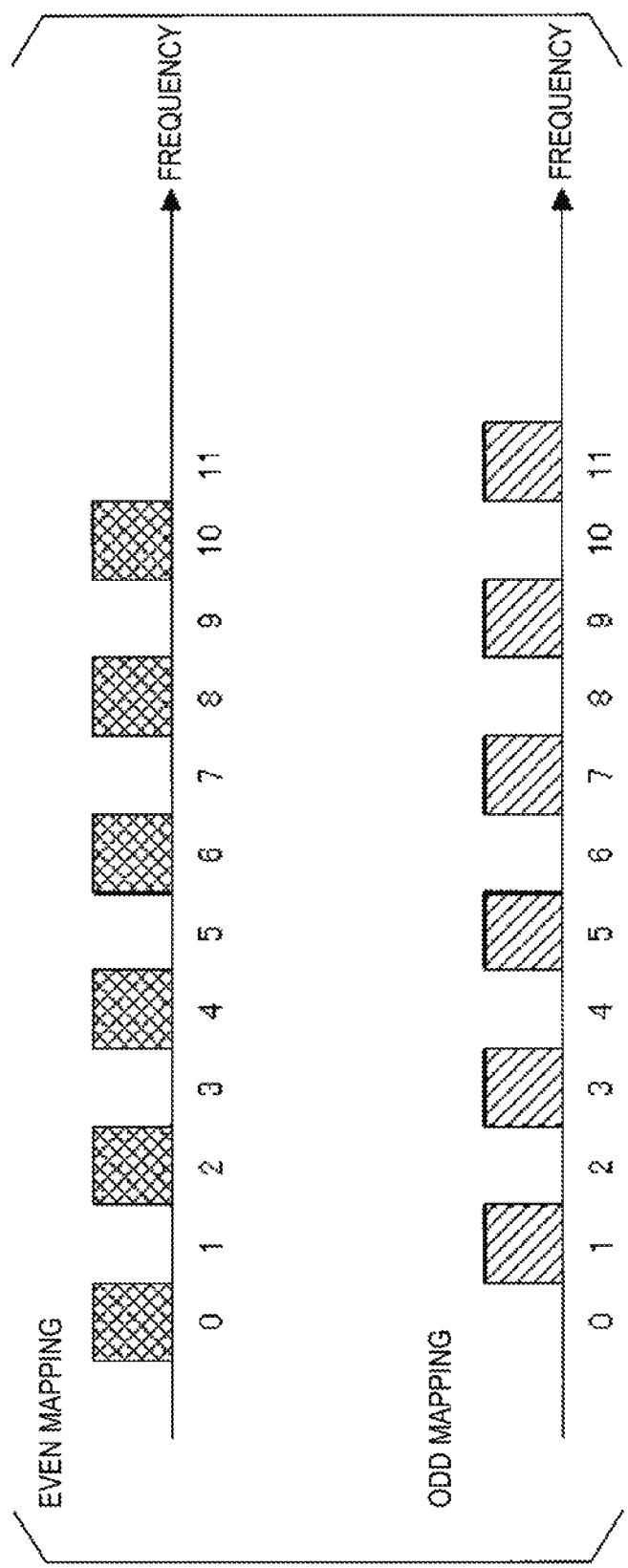
FIG. 2 is a diagram illustrating a frequency allocation of a DMRS configuration 1 according to the first embodiment.

In the NR, in addition to the first OFDM symbol, increasing the number of OFDM symbols to which the DRMSs are mapped has been studied. Here, the first OFDM symbol represents a first OFDM symbol, except for the control signal, among the OFDM symbols in the slot (frame, minislot). For example, the mapping of the DMRSs to the first two OFDM symbols, the mapping of the DMRSs to the first one OFDM symbol and the N-th (N is three or more) OFDM symbol, and the like have been studied. In the configuration of FIG. 2 (DMRS configuration 1), the DFT-S-OFDM and the CP-OFDM are not designated by the DCI field, and the waveform may be switched by the number of OFDM symbols, notified by the control information (for example, RRC signaling), for mapping the DMRSs. For example, for the terminal apparatus, in a case that the DMRS configuration 1 is used and the DMRS is mapped to one OFDM symbol, the waveform may be designated by the DCI field, and in a case that the DMRS configuration 1 is used and the DMRSs are mapped to M pieces of (M is two or more) OFDM symbols, the DFT-S-OFDM may be used. Note that whether to use the notification by the DCI field need not be determined only simply by the number of OFDM symbols to which the DMRSs are mapped. For example, for the terminal apparatus, in a case that the DMRSs are mapped to the first M pieces of the OFDM symbols, the waveform may be designated by the DCI field, and in a case that the DMRSs are mapped to positions other than the first M pieces of the OFDM symbols (the number of OFDM symbols to which the DMRSs are mapped is M), the DFT-S-OFDM may be used.

The SRS is not associated with the transmission of the physical uplink shared channel/the physical uplink control channel. The base station apparatus 10 uses the SRS to measure an uplink channel state (CSI Measurement).

In FIG. 1, at least the following downlink physical channels are used in radio communication of the downlink r31. The downlink physical channels are used for transmitting information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast CHannel (BCH)) that is used commonly by the terminal apparatuses. The MIB is one of pieces of system information. For example, the MIB includes a downlink transmission bandwidth configuration and a System Frame Number (SFN). The MIB may include information for indicating at least some of the number of the slot in which PBCH is transmitted, the number of the subframe in which PBCH is transmitted, and the number of the radio frame in which PBCH is transmitted.

The PDCCH is used to transmit downlink control information (DCI). For the downlink control information, multiple formats based on applications (also referred to as DCI formats) are defined. The DCI format may be defined based on the type and the number of bits of the DCI constituting a single DCI format. Each format is used depending on the application. The downlink control information includes control information for downlink data transmission and control information for uplink data transmission. The DCI format for the downlink data transmission is also referred to as a downlink assignment (or downlink grant) and includes parameters for uplink transmission. The DCI format for the uplink data transmission is also referred to as an uplink grant (or uplink assignment) and includes parameters for uplink transmission.

A single downlink assignment is used for scheduling a single PDSCH in a single serving cell. The downlink grant may be used for at least scheduling of the PDSCH within the same slot as the slot in which the downlink grant has been transmitted. The downlink assignment includes downlink control information, such as a resource block allocation for the PDSCH, a Modulation and Coding Scheme (MCS) for the PDSCH, a NEW Data Indicator (NDI) for indicating initial transmission or retransmission, information for indicating the HARQ process number in the downlink, and a Redundancy version for indicating an amount of redundancy added to the codeword during error correction coding. The codeword is data after the error correcting coding. The downlink assignment may include a Transmission Power Control (TPC) command for the PUCCH and a TPC command for the PUSCH. The uplink grant may include a Repetition number for indicating the number of repetitions for transmission of the PUSCH. Note that the DCI format for each downlink data transmission includes information (fields) required for the application among the above-described information.

A single uplink grant is used for notifying the terminal apparatus of scheduling of a single PUSCH in a single serving cell. The uplink grant includes uplink control information, such as information on the resource block allocation for transmission of the PUSCH (resource block allocation and hopping resource allocation), information on the MCS for the PUSCH (MCS/Redundancy version), the number of cyclic shifts performed on the DMRS, information on retransmission of the PUSCH, a TPC command for the PUSCH, and a request for downlink Channel State Information (CSI)(CSI request). The uplink grant may include information for indicating the HARQ process number in the uplink, a Transmission Power Control (TPC) command for the PUCCH, and a TPC command for the PUSCH. Note that the DCI format for each uplink data transmission includes information (fields) required for the application among the above-described information.

The PDCCH is generated by adding a Cyclic Redundancy Check (CRC) to the downlink control information. In the PDCCH, CRC parity bits are scrambled with a predetermined identifier (also referred to as an exclusive OR operation, mask). The parity bits are scrambled with a Cell-Radio Network Temporary Identifier (C-RNTI), a Semi Persistent Scheduling (SPS) C-RNTI, a Temporary C-RNTI, a Paging (P)-RNTI, a System Information (SI)-RNTI, or a Random Access (RA)-RNTI. The C-RNTI and the SPS C-RNTI are identifiers for identifying a terminal apparatus within a cell. The Temporary C-RNTI is an identifier for identifying the terminal apparatus that has transmitted a random access preamble in a contention based random access procedure. The C-RNTI and the Temporary C-RNTI are used to control PDSCH transmission or PUSCH transmission in a single subframe. The SPS C-RNTI is used to periodically allocate a resource for the PDSCH or the PUSCH. The P-RNTI is used to transmit a paging message (Paging Channel (PCH)). The SI-RNTI is used to transmit the SIB, and the RA-RNTI is used to transmit a random access response (a message 2 in a random access procedure).

The PDSCH is used to transmit the downlink data (the downlink transport block, DL-SCH). The PDSCH is used to transmit a system information message (also referred to as a System Information Block (SIB)). Some or all of the SIBs can be included in the RRC message.

The PDSCH is used to transmit the RRC signaling. The RRC signaling transmitted from the base station apparatus may be common to the multiple terminal apparatuses in the cell (unique to the cell). That is, the information common to the user equipment in the cell is transmitted using the RRC signaling unique to the cell. The RRC signaling transmitted from the base station apparatus may be a message dedicated to a certain terminal apparatus (also referred to as dedicated signaling). In other words, user equipment-specific (user equipment-unique) information is transmitted by using the message dedicated to the certain terminal apparatus.

The PDSCH is used to transmit the MAC CE. The RRC signaling and/or the MAC CE is also referred to as a higher layer signal (higher layer signaling). The PMCH is used to transmit multicast data (Multicast Channel (MCH)).

In the downlink radio communication in FIG. 1, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The downlink reference signal is used for the terminal apparatus to perform the channel estimation/channel compensation on the downlink physical channel. For example, the downlink reference signal is used to demodulate the PBCH, the PDSCH, and the PDCCH. The downlink reference signal can be used for the terminal apparatus to measure the downlink channel state (CSI measurement).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Figure 8:
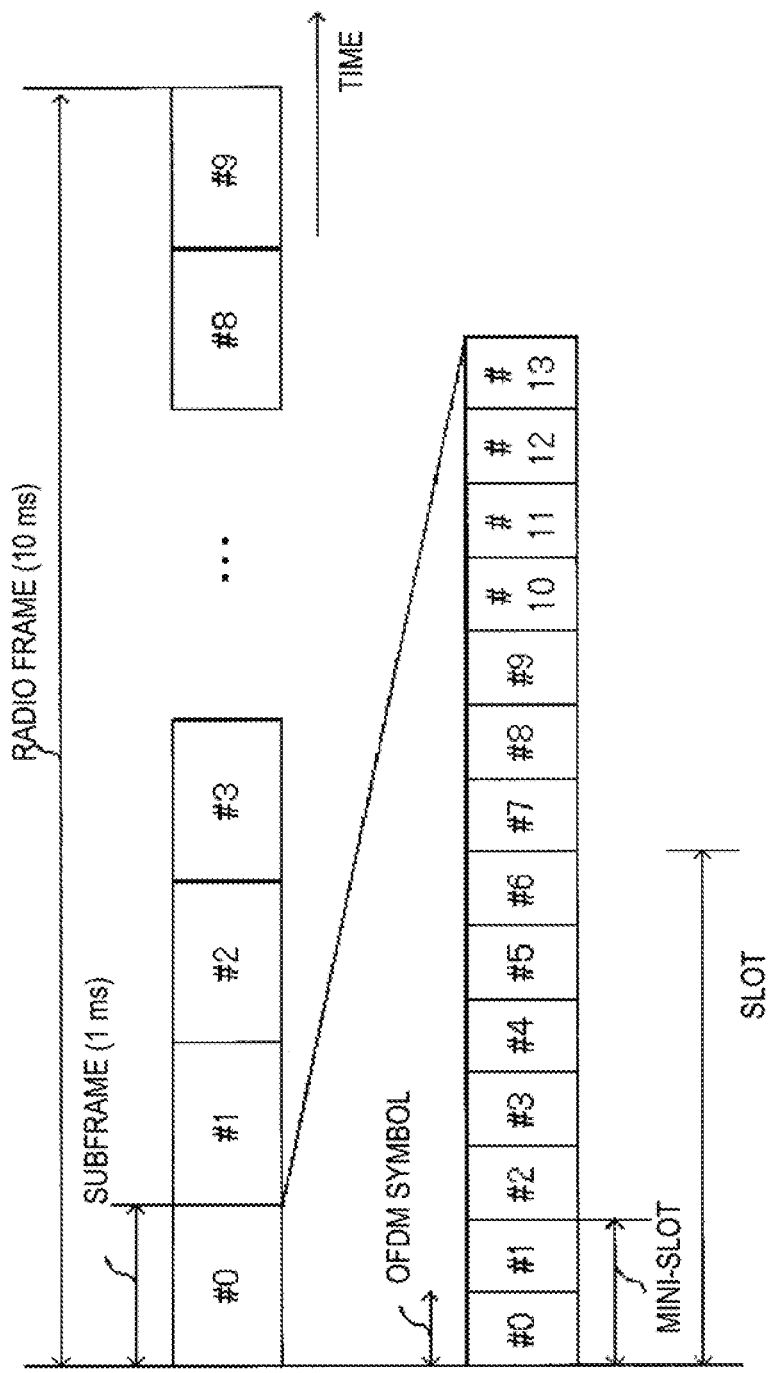
FIG. 8 is a diagram illustrating an example of a radio frame structure for the communication system 1 according to the first embodiment.

FIG. 8 is a diagram illustrating an example of a radio frame configuration for the communication system 1 according to the present embodiment. One radio frame is defined as a fixed length of 10 ms. In a case that subcarrier spacing is 15 kHz, one subframe is defined as a fixed length of 1 ms. One radio frame includes 10 subframes. One slot is defined by the number of OFDM symbols. The number of slots included in one subframe changes depending on the number of OFDMs included in one slot. FIG. 8 is an example in which one slot includes seven OFDM symbols with the slot length of 0.5 ms. In this case, one subframe includes two slots. One mini-slot is defined by the number of OFDM symbols. The number of OFDM symbols included in the mini-slot is smaller than the number of OFDM symbols included in the slot. FIG. 8 is an example in which one mini-slot includes two OFDM symbols. The communication system 1 maps the physical channel to the radio resource on a per slot or per mini-slot basis. Note that, in communications using the DFT-s-OFDM, a DFT-s-OFDM (Single Carrier-Frequency Division Multiple Access (SC-FDMA)) symbol is used as the OFDM symbol.

Figure 9:
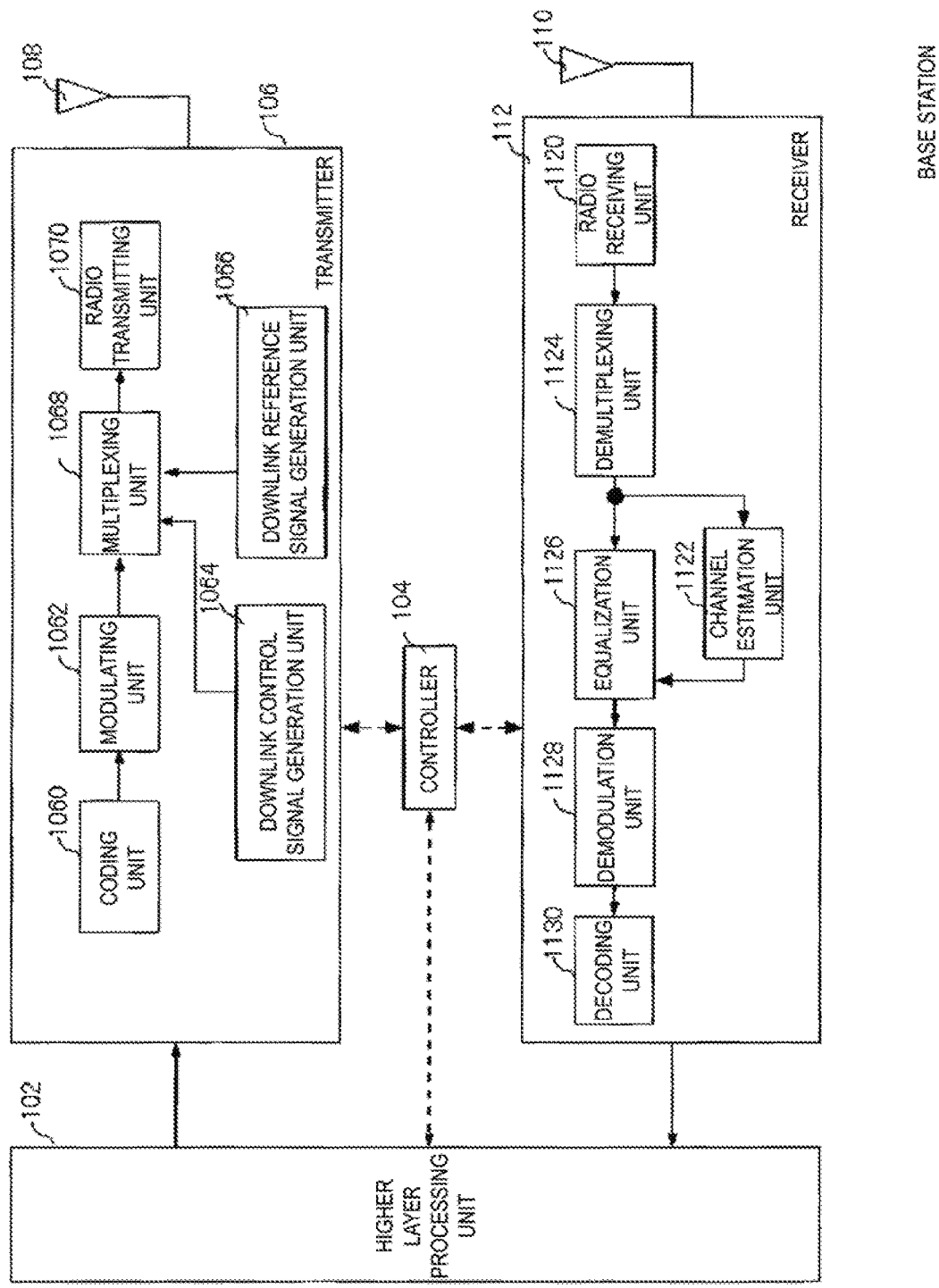
FIG. 9 is a schematic block diagram of a configuration of a base station apparatus 10 according to the first embodiment.

FIG. 9 is a schematic block diagram of a configuration of the base station apparatus 10 according to the present embodiment. The base station apparatus 10 includes a higher layer processing unit (higher layer processing step) 102, a controller (control step) 104, a transmitter (transmitting step) 106, a transmit antenna 108, a receive antenna 110, and a receiver (receiving step) 112. The transmitter 106 generates the physical downlink channel in accordance with a logical channel input from the higher layer processing unit 102. The transmitter 106 is configured to include a coding unit (coding step) 1060, a modulating unit (modulating step) 1062, a downlink control signal generation unit (downlink control signal generating step) 1064, a downlink reference signal generation unit (downlink reference signal generating step) 1066, a multiplexing unit (multiplexing step) 1068, and a radio transmitting unit (radio transmitting step) 1070. The receiver 112 detects (demodulates, decodes, or the like) the physical uplink channel and inputs the content to the higher layer processing unit 102. The receiver 112 is configured to include a radio receiving unit (radio receiving step) 1120, a channel estimation unit (channel estimating step) 1122, a demultiplexing unit (demultiplexing step) 1124, an equalization unit (equalizing step) 1126, a demodulation unit (demodulating step) 1128, and a decoding unit (decoding step) 1130.

The higher layer processing unit 102 performs processing on a layer, such as a Medium Access Control (MAC) layer, a Packet Data Convergence Protocol (PDCP) layer, a Radio Link Control (RLC) layer, and a Radio Resource Control (RRC) layer, that is higher than the physical layer. The higher layer processing unit 102 generates information required to control the transmitter 106 and the receiver 112, and outputs the resultant information to the controller 104. The higher layer processing unit 102 outputs the downlink data (such as DL-SCH), the system information (MIB, SIB), and the like to the transmitter 106. Note that the DMRS configuration information may be notified to the terminal apparatus by using the system information (MIB or SIB), instead of the notification by using the higher layer such as RRC.

The higher layer processing unit 102 generates, or acquires from a higher node, the system information (a part of the MIB or the SIB) to be broadcasted. The higher layer processing unit 102 outputs the system information to be broadcasted to the transmitter 106 as BCH/DL-SCH. The MIB is allocated to the PBCH in the transmitter 106. The SIB is allocated to the PDSCH in the transmitter 106. The higher layer processing unit 102 generates, or acquires from a higher node, the system information (SIB) specific to the terminal apparatus. The higher layer processing unit may include, in the SIB, information on application such as eMBB/URLLC/mMTC. The SIB is allocated to the PDSCH in the transmitter 106.

The higher layer processing unit 102 configures various RNTIs for each terminal apparatus. The RNTI is used for encryption (scrambling) of the PDCCH, the PDSCH, and the like. The higher layer processing unit 102 outputs the RNTI to the controller 104/the transmitter 106/the receiver 112.

In a case that the downlink data (transport block, DL-SCH) allocated to the PDSCH, the system information specific to the terminal apparatus (System Information Block: SIB), the RRC message, the MAC CE, and the DMRS configuration information are not notified by using the system information, such as the SIB and the MIB, and the DCI, the higher layer processing unit 102 generates, or acquires from a higher node, the DMRS configuration information or the like and outputs the information generated or acquired to the transmitter 106. The DMRS configuration information may be configured separately for each of the uplink and the downlink, or may be inclusively configured. The higher layer processing unit 102 manages various kinds of configuration information of the terminal apparatus 20. Note that a part of the function of the radio resource control may be performed in the MAC layer or the physical layer.

The higher layer processing unit 102 receives information on the terminal apparatus, such as the function supported by the terminal apparatus (UE capability), from the terminal apparatus 20 (via the receiver 112). The terminal apparatus 20 transmits its own function to the base station apparatus 10 by a higher layer signal (RRC signaling). The information on the terminal apparatus includes information for indicating whether the terminal apparatus supports a predetermined function or information for indicating that the terminal apparatus has completed introduction and testing of the predetermined function. The information for indicating whether the predetermined function is supported includes information for indicating whether the introduction and testing of the predetermined function have been completed.

In a case that the terminal apparatus supports the predetermined function, the terminal apparatus transmits information (parameters) for indicating whether the predetermined function is supported. In a case that the terminal apparatus does not support the predetermined function, the terminal apparatus may be configured not to transmit information (parameters) for indicating whether the predetermined function is supported. In other words, whether the predetermined function is supported is notified by whether information (parameters) for indicating whether the predetermined function is supported is transmitted. The information (parameters) for indicating whether the predetermined function is supported may be notified by using one bit of 1 or 0.

The higher layer processing unit 102 acquires the DL-SCH from the decoded uplink data (including the CRC) from the receiver 112. The higher layer processing unit 102 performs error detection on the uplink data transmitted by the terminal apparatus. For example, the error detection is performed in the MAC layer.

The controller 104 controls the transmitter 106 and the receiver 112 based on the various kinds of configuration information input from the higher layer processing unit 102/receiver 112. The controller 104 generates the downlink control information (DCI) based on the configuration information input from the higher layer processing unit 102/receiver 112, and outputs the generated downlink control information to the transmitter 106. For example, the controller 104 configures, based on the configuration information on the DMRS input from the higher layer processing unit 102/receiver 112 (whether the configuration is the DMRS configuration 1 or the DMRS configuration 2), the frequency allocation of the DMRS (an even subcarrier or an odd subcarrier in the case of DMRS configuration 1, and any of the zeroth to the second sets in the case of the DMRS configuration 2), and generates the DCI. With the DCI, in addition to the frequency allocation of the DMRS, information on the FDM of the data signal and the DMRS, information on the waveform, information on the cyclic shift of the DMRS, a coding pattern of an Orthogonal Cover Code (OCC) in the frequency domain, a coding pattern of the OCC in the time domain in a case that DMRS symbols are configured across multiple OFDM symbols, and the like may be notified. In addition to the information on the DMRS, the DCI includes various kinds of information, such as information on the MCS and the frequency allocation.

The controller 104 determines the MCS of the PUSCH in consideration of channel quality information (CSI Measurement result) measured by the channel estimation unit 1122. The controller 104 determines an MCS index corresponding to the MCS of the PUSCH. The controller 104 includes, in the uplink grant, the MCS index determined.

The transmitter 106 generates the PBCH, the PDCCH, the PDSCH, the downlink reference signal, and the like in accordance with the signal input from the higher layer processing unit 102/controller 104. The coding unit 1060 performs encoding (including repetition) using block code, convolutional code, turbo code, polar coding, LDPC code, or the like on the BCH, the DL-SCH, and the like input from the higher layer processing unit 102 by using a predetermined coding scheme/a coding scheme determined by the higher layer processing unit 102. The coding unit 1060 performs puncturing on the coded bits based on the coding rate input from the controller 104. The modulating unit 1062 performs data modulation on the coded bits input from the coding unit 1060 by using a predetermined modulation scheme (modulation order)/a modulation scheme (modulation order) input from the controller 104, such as the BPSK, QPSK, 16QAM, 64QAM, or 256QAM. The modulation order is based on the MCS index selected by the controller 104.

The downlink control signal generation unit 1064 adds the CRC to the DCI input from the controller 104. The downlink control signal generation unit 1064 encrypts (scrambles) the CRC by using the RNTI. Furthermore, the downlink control signal generation unit 1064 performs QPSK modulation on the DCI to which the CRC is added, and generates the PDCCH. The downlink reference signal generation unit 1066 generates a sequence known to the terminal apparatus as a downlink reference signal. The known sequence is determined by a predetermined rule based on a physical cell identity for identifying the base station apparatus 10 and the like.

The multiplexing unit 1068 multiplexes the PDCCHs/downlink reference signals/modulation symbols of the respective channels input from the modulating unit 1062. In other words, the multiplexing unit 1068 maps the PDCCHs/downlink reference signals/modulation symbols of the respective channels to the resource elements. The resource elements to which the mapping is performed are controlled by downlink scheduling input from the controller 104. The resource element is the minimum unit of a physical resource including one OFDM symbol and one subcarrier. Note that, in a case of performing MIMO transmission, the transmitter 106 includes the coding units 1060 and the modulating units 1062. Each of the number of the coding units 1060 and the number of the modulating units 1062 is equal to the number of layers. In this case, the higher layer processing unit 102 configures the MCS for each transport block in each layer.

The radio transmitting unit 1070 performs Inverse Fast Fourier Transform (IFFT) on the multiplexed modulation symbols and the like to generate OFDM symbols. The radio transmitting unit 1070 adds cyclic prefixes (CPs) to the OFDM symbols to generate a baseband digital signal. Furthermore, the radio transmitting unit 1070 converts the digital signal into an analog signal, removes unnecessary frequency components from the analog signal by filtering, performs up-conversion to a signal of a carrier frequency, performs power amplification, and outputs the resultant signal to the transmit antenna 108 for transmission.

In accordance with an indication from the controller 104, the receiver 112 detects (separates, demodulates, and decodes) the reception signal received from the terminal apparatus 20 through the receive antenna 110, and inputs the decoded data to the higher layer processing unit 102/controller 104. The radio receiving unit 1120 converts the uplink signal received through the receive antenna 110 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 1120 removes a part corresponding to the CP from the converted digital signal. The radio receiving unit 1120 performs Fast Fourier Transform (FFT) on the signal from which the CPs have been removed, and extracts a signal in the frequency domain. The signal in the frequency domain is output to the demultiplexing unit 1124.

The demultiplexing unit 1124 demultiplexes the signals input from the radio receiving unit 1120 into signals, such as the PUSCH, the PUCCH, and the uplink reference signal, based on uplink scheduling information (such as uplink data channel allocation information) input from the controller 104. The uplink reference signal resulting from the demultiplexing is input to the channel estimation unit 1122. The PUSCH and PUCCH resulting from the demultiplexing are output to the equalization unit 1126.

The channel estimation unit 1122 uses the uplink reference signal to estimate a frequency response (or a delay profile). The result of frequency response in the channel estimation for demodulation is input to the equalization unit 1126. The channel estimation unit 1122 measures the uplink channel condition (measures a Reference Signal Received Power (RSRP), a Reference Signal Received Quality (RSRQ), and a Received Signal Strength Indicator (RSSI)) by using the uplink reference signal. The measurement of the uplink channel state is used to determine the MCS for the PUSCH and the like.

The equalization unit 1126 performs processing to compensate for an influence in a channel based on the frequency response input from the channel estimation unit 1122. As a method for the compensation, any existing channel compensation, such as a method of multiplying an MMSE weight or an MRC weight and a method of applying an MLD, is applicable. The demodulation unit 1128 performs demodulation processing based on the information on a predetermined modulation scheme/modulation scheme indicated by the controller 104.

The decoding unit 1130 performs decoding processing on the output signal from the demodulation unit based on the information on a predetermined coding rate/coding rate indicated by the controller 104. The decoding unit 1130 inputs the decoded data (such as the UL-SCH) to the higher layer processing unit 102.

Figure 10:
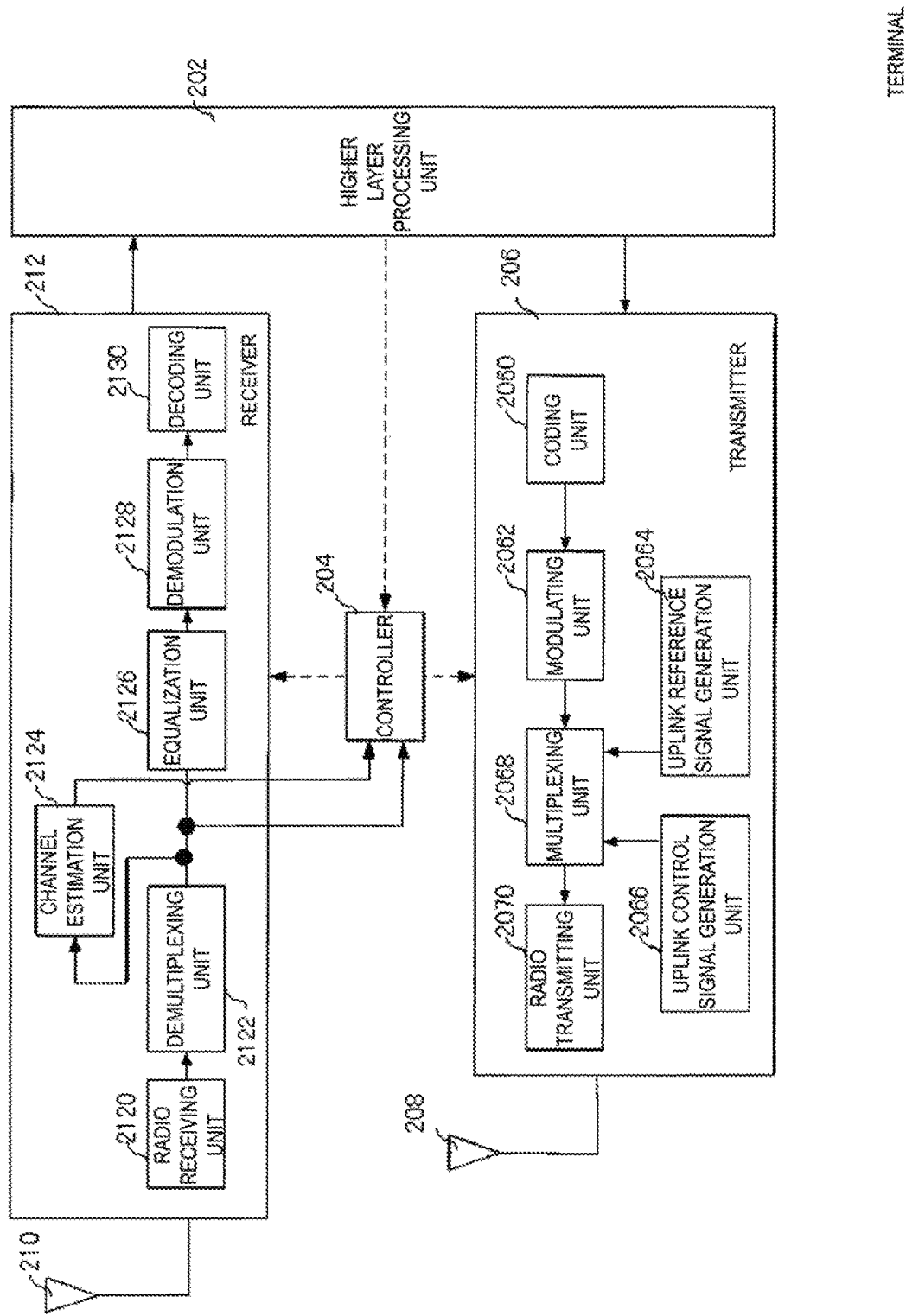
FIG. 10 is a schematic block diagram illustrating a configuration of a terminal apparatus 20 according to the first embodiment.

FIG. 10 is a schematic block diagram of a configuration of the terminal apparatus 20 according to the present embodiment. The terminal apparatus 20 is configured to include a higher layer processing unit (higher layer processing step) 202, a controller (control step) 204, a transmitter (transmitting step) 206, a transmit antenna 208, a receive antenna 210, and a receiver (receiving step) 212.

The higher layer processing unit 202 performs processing of the medium access control (MAC) layer, the packet data convergence protocol (PDCP) layer, the radio link control (RLC) layer, and the radio resource control (RRC) layer. The higher layer processing unit 202 manages various kinds of configuration information of the terminal apparatus itself. The higher layer processing unit 202 notifies the base station apparatus 10 of information for indicating terminal apparatus functions supported by the terminal apparatus itself (UE Capability) via the transmitter 206. The higher layer processing unit 202 notifies the UE Capability by RRC signaling.

The higher layer processing unit 202 acquires the decoded data, such as the DL-SCH and the BCH, from the receiver 212. The higher layer processing unit 202 generates the HARQ-ACK from a result of the error detection of the DL-SCH. The higher layer processing unit 202 generates the SR. The higher layer processing unit 202 generates the UCI including the HARQ-ACK/SR/CSI (including the CQI report). In a case that the DMRS configuration information is notified by the higher layer, the higher layer processing unit 202 inputs the information on the DMRS configuration to the controller 204. The higher layer processing unit 202 inputs the UCI and the UL-SCH to the transmitter 206. Note that some functions of the higher layer processing unit 202 may be included in the controller 204.

The controller 204 interprets the downlink control information (DCI) received via the receiver 212. The controller 204 controls the transmitter 206 in accordance with PUSCH scheduling/MCS index/Transmission Power Control (TPC), and the like acquired from the DCI for uplink transmission. The controller 204 controls the receiver 212 in accordance with the PDSCH scheduling/the MCS index and the like acquired from the DCI for downlink transmission. Furthermore, the controller 204 identifies the frequency allocation of the DMRS according to the information on the frequency allocation of the DMRS included in the DCI for downlink transmission and the DMRS configuration information input from the higher layer processing unit 202.

The transmitter 206 is configured to include a coding unit (coding step) 2060, a modulating unit (modulating step) 2062, an uplink reference signal generation unit (uplink reference signal generating step) 2064, an uplink control signal generation unit (uplink control signal generating step) 2066, a multiplexing unit (multiplexing step) 2068, and a radio transmitting unit (radio transmitting step) 2070.

In accordance with the control by the controller 204 (in accordance with the coding rate calculated based on the MCS index), the coding unit 2060 codes the uplink data (UL-SCH) input from the higher layer processing unit 202 by convolutional coding, block coding, turbo coding, or the like.

The modulating unit 2062 modulates the coded bits input from the coding unit 2060 (generates modulation symbols for the PUSCH) by a modulation scheme indicated from the controller 204/modulation scheme predetermined for each channel, such as BPSK, QPSK, 16QAM, 64QAM, and 256QAM. In addition, in a case that the DMRS configuration 1 is notified by the higher layer, the base station apparatus indicates the DFT-S-OFDM to be used as the transmission scheme according to a predetermined DCI field value, and the terminal apparatus is notified of the use of the DFT-S-OFDM as the transmission scheme by using the DCI, Discrete Fourier Transform (DFT) is applied to a modulation symbol sequence. On the other hand, in a case that the DMRS configuration 2 is notified by the higher layer or the DMRS configuration 1 is notified by the higher layer and the use of the CP-OFDM as the transmission scheme is notified according to the predetermined DCI field value, since the CP-OFDM is applied as the transmission scheme, the DFT is not applied to the modulation symbol sequence.

The uplink reference signal generation unit 2064 generates a sequence determined from a predetermined rule (formula), based on a physical cell identity (PCI), which is also referred to as a cell ID, or the like, for identifying the base station apparatus 10, a bandwidth in which the uplink reference signals are mapped, a cyclic shift, parameter values to generate the DMRS sequence, further the frequency allocation, and the like, in accordance with an indication by the controller 204.

In accordance with the indication from the controller 204, the uplink control signal generation unit 2066 encodes the UCI, performs the BPSK/QPSK modulation, and generates modulation symbols for the PUCCH.

In accordance with the uplink scheduling information from the controller 204 (transmission interval in the SPS for the uplink included in the RRC message, resource allocation included in the DCI, and the like), the multiplexing unit 2068 multiplexes the modulation symbols for the PUSCH, the modulation symbols for the PUCCH, and the uplink reference signals for each transmit antenna port (in other words, the respective signals are mapped to the resource elements).

The radio transmitting unit 2070 performs Inverse Fast Fourier Transform (IFFT) on the multiplexed signals to generate OFDM symbols. The radio transmitting unit 2070 adds CPs to the OFDM symbols to generate a baseband digital signal. Furthermore, the radio transmitting unit 2070 converts the baseband digital signal into an analog signal, removes unnecessary frequency components from the analog signal, converts the signal into a signal of a carrier frequency by up-conversion, performs power amplification, and transmits the resultant signal to the base station apparatus 10 via the transmit antenna 208.

The receiver 212 is configured to includes a radio receiving unit (radio receiving step) 2120, a demultiplexing unit (demultiplexing step) 2122, a channel estimation unit (channel estimating step) 2144, an equalization unit (equalizing step) 2126, a demodulation unit (demodulating step) 2128, and a decoding unit (decoding step) 2130.

The radio receiving unit 2120 converts the downlink signal received through the receive antenna 210 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 2120 removes a part corresponding to the CP from the digital signal resulting from the conversion, performs the FFT on the signal from which the CP has been removed, and extracts a signal in the frequency domain.

The demultiplexing unit 2122 separates the extracted signal in the frequency domain into the downlink reference signal, the PDCCH, the PDSCH, and the PBCH. A channel estimation unit 2124 uses the downlink reference signal (such as the DM-RS) to estimate a frequency response (or delay profile). The result of frequency response in the channel estimation for demodulation is input to the equalization unit 1126. The channel estimation unit 2124 measures the uplink channel state (measures a Reference Signal Received Power (RSRP), a Reference Signal Received Quality (RSRQ), a Received Signal Strength Indicator (RSSI), and a Signal to Interference plus Noise power Ratio (SINR)) by using the downlink reference signal (such as the CSI-RS). The measurement of the downlink channel state is used to determine the MCS for the PUSCH and the like. The measurement result of the downlink channel state is used to determine the CQI index and the like.

The equalization unit 2126 generates an equalization weight based on an MMSE criterion, from the frequency response input from the channel estimation unit 2124. The equalization unit 2126 multiplies the input signal (the PUCCH, the PDSCH, the PBCH, and the like) from the demultiplexing unit 2122 by the equalization weight. The demodulation unit 2128 performs demodulation processing based on information of the predetermined modulation order/the modulation order indicated by the controller 204.

The decoding unit 2130 performs decoding processing on the output signal from the demodulation unit 2128 based on information of the predetermined coding rate/the coding rate indicated by the controller 204. The decoding unit 2130 inputs the decoded data (such as the DL-SCH) to the higher layer processing unit 202.

According to one or more aspects of the present invention, in a case that the DMRS configuration 1 is configured by the higher layer processing unit, the transmission scheme can be changed, and in a case that the DMRS configuration 2 is configured, the FDM of the data signal and the reference signal can be configured. As a result, efficient control by using the DCI corresponding to each DMRS configuration can be performed.

Second Embodiment

In the first embodiment, it is assumed that in a case that the DMRS configuration 1 is configured, the waveform is switched by using the DCI, and the DMRS and the data signal are not multiplexed in one OFDM symbol. However, in a case that the CP-OFDM is used, the PAPR is not problematic, so the FDM performed on the DMRS and the data signal in the DMRS configuration 1 is not problematic. Therefore, in the present embodiment, a method for allowing frequency-domain multiplexing of the data signal and the DMRS in a case that the DMRS configuration 1 is configured and the CP-OFDM is further configured will be described.

In the present embodiment, regardless of whether the DMRS configuration is 1 or 2, a bit indicating whether to allow multiplexing of the data signal and the DMRS is included in the DCI, and the base station apparatus transmits the DCI to the terminal apparatus. In a case that the DMRS configuration 2 is configured by the higher layer processing unit, similar to the first embodiment, the waveform is fixed to the CP-OFDM, and the base station apparatus designates whether to allow multiplexing of the data signal and the DMRS by using the bit in the DCI. On the other hand, similarly in a case that the DMRS configuration 1 is configured by the higher layer processing unit, the base station apparatus designates whether to allow multiplexing of the data signal and the DMRS by using the bit in the DCI. However, different from a case where the DMRS configuration 2 is configured by the higher layer processing unit, in a case that the DCI notified by the base station apparatus indicates multiplexing of the data signal and the DMRS to be performed, the controller in the terminal apparatus uses the CP-OFDM as the waveform in the uplink transmission. In other words, in a case that the DCI notified by the base station apparatus indicates the CP-OFDM to be used as the waveform in uplink transmission, the controller in the terminal apparatus generates OFDM symbols where frequency-domain multiplexing of the data signal and the DMRS has been performed. On the other hand, in a case of receiving the DCI indicating that the data signal and the DMRS are not to be multiplexed, the controller in the terminal apparatus uses the DFT-S-OFDM as the waveform in uplink.

Thus, according to the present embodiment, in a case that the DMRS configuration 1 is configured by the higher layer processing unit, the base station apparatus associates the information on the multiplexing of the data signal and the DMRS with the information on the waveform for designation. As a result, efficient transmission can be performed while preventing an increase in PAPR with a small volume of control information.

Third Embodiment

In the first and second embodiments, the number of ranks of the uplink transmission (the number of streams, the number of layers) is assumed to be 1. In the present embodiment, a case in which the number of ranks is greater than one will be described.

Compared with a case that the CP-OFDM is applied, the DFT-S-OFDM is effective in a case that the DFT-S-OFDM is applied to a terminal apparatus at a cell edge, that is, a terminal for which a maximum power or a high transmission power equivalent to the maximum power needs to be configured. Since the possibility that the terminal apparatus at the cell edge performs transmission with the number of ranks greater than one is low, it has been agreed that the number of ranks of the DFT-S-OFDM is limited to 1 in the NR.

Thus, in a case that the DMRS configuration 1 is configured by the higher layer and the number of ranks notified by the base station apparatus by using the DCI is greater than one, the controller in the terminal apparatus uses the CP-OFDM as the uplink transmission scheme and switches whether to multiplex the reference signal and the data signal according to a value of a predetermined field of the DCI. Note that in a case that the DMRS configuration 1 is configured by the higher layer and the number of ranks notified by the base station apparatus with the DCI is one, switching between the CP-OFDM and the DFT-S-OFDM is performed according to a predetermined field in the DCI format. At this time, as in the first embodiment, in a case that the DMRS configuration 1 is configured, the configuration may be a configuration in which the reference signal and the data signal are not multiplexed, or, as in the second embodiment, whether to multiplex the reference signal and data signal may be switched by using the DCI, not in accordance with the DMRS configuration. The receiver in the base station apparatus performs reception processing based on the transmitted DCI.

Thus, according to the present embodiment, in a case of the DMRS configuration 1 and the number of ranks being greater than one, the transmission scheme is determined to be CP-OFDM, and whether to multiplex the reference signal and data signal is switched by using the DCI. As a result, efficient transmission can be performed even in a case that the number of ranks is not one.

Note that some or all of the above-described embodiments can be combined for implementation.

A program running on an apparatus according to an aspect of the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In that case, a program for realizing the functions of the embodiments may be recorded on a computer readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be preferably used in a base station apparatus, a terminal apparatus, and a communication method. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

10 Base station apparatus
20 Terminal apparatus
10a Range within which base station apparatus 10 is connectable to terminal apparatus
102 Higher layer processing unit
104 Controller
106 Transmitter
108 Transmit antenna
110 Receive antenna
112 Receiver
1060 Coding unit
1062 Modulating unit
1064 Downlink control signal generation unit
1066 Downlink reference signal generation unit
1068 Multiplexing unit
1070 Radio transmitting unit
1120 Radio receiving unit
1122 Channel estimation unit
1124 Demultiplexing unit
1126 Equalization unit
1128 Demodulation unit
1130 Decoding unit
202 Higher layer processing unit
204 Controller
206 Transmitter
208 Transmit antenna
210 Receive antenna
212 Receiver
2060 Coding unit
2062 Modulating unit
2064 Uplink reference signal generation unit
2066 Uplink control signal generation unit
2068 Multiplexing unit
2070 Radio transmitting unit
2120 Radio receiving unit
2122 Demultiplexing unit
2124 Channel estimation unit
2126 Equalization unit
2128 Demodulation unit
2130 Decoding unit

The invention claimed is:

1. A terminal apparatus which communicates with a base station apparatus by using a slot which includes a plurality of orthogonal frequency division multiplexing (OFDM) symbols, the terminal apparatus comprising:
multiplexing circuitry configured to map one or more demodulation reference signal (DMRS) symbols into the slot; and
control circuitry configured to determine a mapping of data into a resource element in the one or more DMRS symbols based on first information related to a DMRS configuration, the first information included in radio resource control (RRC) signaling, second information related to a DMRS, the second information included in downlink control information (DCI), and third information indicating whether a discrete Fourier transform (DFT) is applied, wherein the first information, the second information and the third information are received from the base station apparatus.

2. The terminal apparatus according to claim 1, wherein:
the DCI includes fourth information related to a number of layers, and
the control circuitry is further configured to determine the mapping of the data into the resource element in the one or more DMRS symbols based on the fourth information.

3. The terminal apparatus according to claim 1, wherein in a case where the third information indicates that the DFT is not applied, the control circuitry is further configured to determine the mapping of the data into the resource element in the one or more DMRS symbols based on the second information.

4. A base station apparatus which communicates with a terminal apparatus by using a slot which includes a plurality of orthogonal frequency division multiplexing (OFDM) symbols, the base station apparatus comprising:
transmission circuitry configured to transmit radio resource control (RRC) signaling including first information related to a demodulation reference signal (DMRS) configuration, transmit downlink control information (DCI) including second information related to a DRMS, and transmit third information indicating whether a discrete Fourier transform (DFT) is applied; and
reception circuitry configured to receive one or more DMRS symbols mapped into the slot,
wherein a mapping of data into a resource element in the one or more DMRS symbols is determined based on at least the first information, the second information, and the third information.

5. The base station apparatus according to claim 4, wherein:
the DCI includes fourth information related to a number of layers, and
the mapping of the data into the resource element in the one or more DMRS symbols is determined based on the fourth information.

6. The terminal apparatus according to claim 4, wherein in a case where the third information indicates that the DFT is not applied, the mapping of the data into the resource element in the one or more DMRS symbols is determined based on the second information.

7. A communication method for a terminal apparatus which communicates with a base station apparatus by using a slot which includes a plurality of orthogonal frequency division multiplexing (OFDM) symbols, the communication method comprising:
mapping one or more demodulation reference signal (DMRS) symbols into the slot; and
determining a mapping of data into a resource element in the one or more DMRS symbols based on first information related to a DMRS configuration, the first information included in radio resource control (RRC) signaling, second information related to a DMRS, the second information included in downlink control information (DCI), and third information indicating whether a discrete Fourier transform (DFT) is applied,
wherein the first information, the second information and the third information are received from the base station apparatus.

8. A communication method for a base station apparatus which communicates with a terminal apparatus by using a slot which includes a plurality of orthogonal frequency division multiplexing (OFDM) symbols, the communication method comprising:
    transmitting radio resource control (RRC) signaling including first information related to a demodulation reference signal (DMRS) configuration;
    transmitting downlink control information (DCI) including second information related to a DMRS;
    transmitting third information indicating whether a discrete Fourier transform (DFT) is applied; and
    receiving one or more DMRS symbols mapped into the slot,
    wherein a mapping of data into a resource element in the one or more DMRS symbols is determined based on at least the first information, the second information, and the third information.

* * * * *